No. 861,197. PATENTED JULY 23, 1907.
A. SUNDH.
SYSTEM OF MOTOR CONTROL.
APPLICATION FILED DEC. 27, 1904.
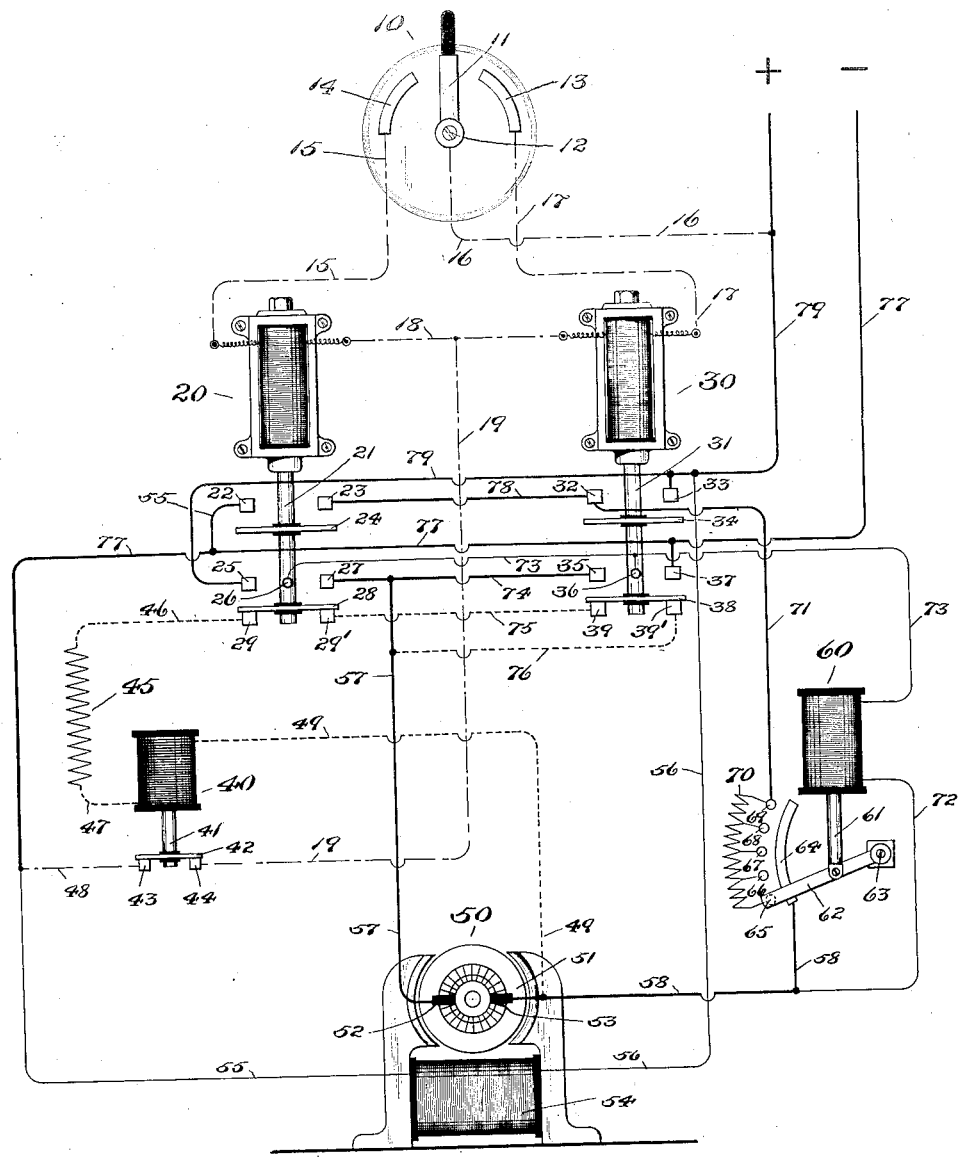
WITNESSES:
Lewis B. Hunter
Walter C. Strang
INVENTOR
August Sundh
BY
E. W. Marshall
ATTORNEY

UNITED STATES PATENT OFFICE.

AUGUST SUNDH, OF YONKERS, NEW YORK, ASSIGNOR TO OTIS ELEVATOR COMPANY, OF JERSEY CITY, NEW JERSEY, A CORPORATION OF NEW JERSEY.

SYSTEM OF MOTOR CONTROL.

No. 861,197.　　　　　Specification of Letters Patent.　　　　Patented July 23, 1907.

Application filed December 27, 1904. Serial No. 238,325.

*To all whom it may concern:*

Be it known that I, AUGUST SUNDH, a citizen of the United States, residing at Yonkers, in the county of Westchester and State of New York, have invented certain new and useful Improvements in Systems of Motor Control, of which the following is a specification.

My invention relates to a system of motor control, and its particular object is to provide means for preventing the sudden reversing of an electric motor.

I will describe an electric controlling system embodying my invention and point out the novel features thereof in claims.

The drawing accompanying this specification is a diagrammatic representation of an electric motor control system.

In the drawing, 50 designates an electric motor, the armature of which is designated by 51; 52 and 53 are the armature brushes, and 54 the shunt field.

10 designates a manually-operated switch, which comprises a movable contact 11, which is pivoted at 12, and which is adapted to be moved into electrical contact with two stationary contacts 13 and 14.

20 and 30 designate two magnets, which are arranged to operate an electro-magnetic reversing switch, which will be explained more in detail later.

40 is an electro-magnet, which is arranged to control the connection between two stationary contacts 43, 44.

60 designates a solenoid or electro-magnet, which is arranged to move a contact-arm 62, which is pivoted at 63 across a segmental contact 64, and a series of contact points 65, 66, 67, 68, 69.

I will now trace the secondary circuit in this system, which is used to operate the electro-magnetic reversing switch. In the drawing this circuit is represented by a broken line composed of dots and dashes. A conductor 16 connects + or the positive main to the movable contact 11 of the manually-operated switch. Whenever this movable contact 11 is moved to the left, a circuit may be thereby completed through the stationary contact 14, the conductor 15, the magnet 20, conductors 18 and 19, to stationary contact 44, thence through the bridge-piece 42 and contact 43, thence through conductor 48, to the conductor 77, which is the − or negative main. The circuit which is thus completed will cause the magnet 20 to be energized, so that it will lift its plunger 21, which carries two contact plates 24 and 28, which are attached to but insulated from the plunger 21. These contact plates will close the circuits between the contacts 22, 23, and 25, 27, respectively, and at the same time 28 will break a circuit between contacts 29 and 29'. This operation will cause the circuit to be closed from the positive main to the brush 52 of the motor through the conductors 79 and 57, through the motor armature to the brush 51, thence through conductor 58, the starting resistance 70, conductors 71, 78, and 55, to the negative main. At the same time the magnet 60 will be connected across the brushes 52, 53 of the motor armature. The shunt field 54, of the motor, as shown, is connected to the positive and negative mains by the wires 56 and 55. The above operations will cause the motor armature to revolve in one direction. The magnet 60 will become energized by the potential across the brushes of the armature and will draw its core or plunger 61 up and cause the pivoted contact arm 62 to be drawn up over the contact points 65, 66, 67, 68, and 69, thus cutting out in a number of steps the starting resistance 70. If the operator had moved the pivoted contact 11 to the right, the operation would have been similar, but in this case the magnet 30 would have been energized instead of the magnet 20, and the contact plates which it is adapted to lift would close the circuits in such a way as to cause the armature to revolve in the opposite direction.

When the operator desires to stop the motor when it is running, as we have already described, he will bring the pivoted contact 11 back to its vertical or central position. Let us, for example, say that he has previously moved it to the left onto the stationary contact 14. Now when he moves the pivoted contact 11 back to center, the circuit through the magnet 20 will thereby be broken between the contact 14 and the pivoted contact 11. The magnet 20 will thereby become deënergized, and allow its plunger 21 with its contact plates 24 and 28 to drop. This will break the motor armature circuit between the contacts 22 and 23, and also between the contacts 25 and 27. It will also break the circuit through the magnet 60 at the stationary contact 26. These parts of the operation will cut off the supply of current to the motor armature and to the magnet 60. The latter will become deënergized and allow its plunger 61 and the pivoted lever 62 to drop, thus putting the starting resistance 70 back into the circuit ready for the next operation.

When the contact plate 28 drops back to its lower position, it rests upon two stationary contacts 29 and 29', and completes a circuit through the resistance 45 and the magnet 40, across the brushes of the motor armature. As this circuit constitutes an important part of my present invention, I will now trace it from the armature brush 51 to the other armature brush 52. It is shown on the drawing by a broken line. Starting at the brush 51, the conductor 49 runs to one end of the winding of magnet 40. The circuit goes through this winding and is led by a conductor 47 to the lower end of the resistance 45. The other end of the resistance 45 is connected by the conductor 46 to a stationary contact 29. The contact plate 28, which we have stated is now resting upon contacts 29 and 29', closes the circuit across them, and it is then led by a conductor 75 to the contact 39, which is now connected to a contact 39' by a contact plate 38. The conductors 76 and 57 complete this circuit back to the brush 52 of the motor. As the field 54 of the motor is shown connected across the mains, it is clear that it will be energized. While the motor armature 51 continues to rotate, it will generate a current, which will flow through the circuit which we have just traced. This current will cause the magnet 40 to be energized, so that it will lift its plunger 41 and the contact plate 42 which is attached to it, so that the latter is raised from the stationary contacts 43 and 44. As long as the motor armature has any considerable rate of rotation, it will generate sufficient current to cause the magnet to keep this contact plate 42 raised from the contacts 43 and 44. It will be seen if while the circuit is in this present condition, the operator attempts to close a circuit through either the magnet 20 or through the magnet 30 by moving the pivoted lever 11 of the switch 10 to one side or the other, he will be unable to do so, as the circuit which he would otherwise be able to establish through these magnets will be broken between the contacts 43 and 44. When the motor armature comes to rest or when it has lost most of its movement, the magnet 40 will become deënergized, and the contact plate 42 will again bridge the contacts 43 and 44, so that the operator will be able to control the system as before. The resistance 45, which is shown in circuit with magnet 40, may be used when desired to place a short circuit across the brushes of the armature and thus put a load upon the motor, which will act as an electro-dynamic brake, and have a tendency to bring the motor to rest, as is well known. In case this resistance 45 is used, it is desirable to have the magnet 40 of low resistance. It will now appear that by the combination of circuits and the various parts controlling them which I have shown, that if the operator has started the motor running in either direction and has then tried to stop it, he cannot again close a circuit through the motor until its armature has either come to rest or slowed down considerably. It will, therefore, be impossible for him to injure the motor by reversing it suddenly, as he might otherwise do without the apparatus above described.

1. In a system of motor control, the combination with a motor, of electro-responsive apparatus for effecting the reversal of said motor, and means dependent upon the motor for controlling the operating circuit of said electro-responsive apparatus to prevent reversal of the motor before substantial reduction in speed thereof.

2. In a system of motor control, the combination with a motor, of reversing switches therefor, an electro-magnet associated with each switch, and means for controlling the circuit of said electro-magnets to prevent energization of the latter immediately after one of said switches opens.

3. In a system of motor control, the combination of a motor, reversing mechanism therefor, electric means for actuating the reversing mechanism, and a device controlled by the speed of the armature for interrupting the circuit of said electric means to prevent a sudden change in the direction of rotation of the armature.

4. In a system of motor control, the combination of a motor, reversing switches for such motor, an electro-magnet associated with each switch for operating the same, means set into action by the opening of one of these reversing switches for preventing the immediate energization of the electro-magnet associated with the other switch.

5. In a system of motor control, the combination of a motor, reversing switches, an operating circuit therefor, and means controlled by the speed of the armature for maintaining the operating circuit open until such speed is substantially reduced.

6. In a system of motor control, the combination of a motor, reversing switches for the motor, an operating circuit including such reversing switches, an independent circuit across the brushes of the armature which is closed by the opening of either of the reversing switches, and automatic means included in the independent circuit for maintaining open the operating circuit to either reversing switch until the speed of the motor is substanfially reduced.

7. In a system of motor control, the combination of a motor, a pair of reversing switches therefor, an operating circuit including said switches, an independent circuit across the brushes of the armature of the motor, contacts in said independent circuit, means for opening or bridging such contacts by the actuation of either of the reversing switches, contacts in the operating circuit, and a device controlled by the speed of the armature for opening or bridging the last-mentioned contacts.

8. In a system of motor control, the combination of a motor, a pair of reversing switches therefor, a manual switch for operating the reversing switches, an operating circuit including the manual and the reversing switches, an independent circuit across the brushes of the armature of the motor, contacts in the independent circuit, and a device connected to each of the reversing switches for closing such contacts when such reversing switches are opened, contacts in the operating circuit, and a device controlled by the speed of the armature for opening or bridging such contacts, thereby maintaining open or closed the operating circuit to either reversing switch according to the speed of such armature and notwithstanding any operation of the manual switch.

9. In a system of motor control, the combination of a motor, reversing switches therefor, magnets for operating such reversing switches, a manual switch and an operating circuit including such manual switch and such magnets, an independent circuit across the brushes of the armature, contacts in the independent circuit bridged or opened respectively as a reversing magnet is de-energized or energized, contacts in the operating circuit, and a magnet carrying a movable contact for opening or bridging such contacts of the operating circuit according to the speed of rotation of the armature; whereby when the circuit connections are manually reversed the operating circuit is maintained open until the speed of the armature is substantially reduced.

In testimony whereof I have signed my name in the presence of two subscribing witnesses.

AUGUST SUNDH.

Witnesses:
WALTER C. STRANG,
ERNEST W. MARSHALL.